United States Patent [19]
Lin et al.

[11] Patent Number: 5,668,420
[45] Date of Patent: Sep. 16, 1997

[54] MAGNETOHYDRODYNAMIC APPARATUS

[75] Inventors: Thomas F. Lin, State College; James B. Gilbert, II, Fleming, both of Pa.

[73] Assignee: The Penn State Research Foundation, University Park, Pa.

[21] Appl. No.: 418,058

[22] Filed: Apr. 6, 1995

[51] Int. Cl.$^6$ .................................................. H02K 44/04
[52] U.S. Cl. .................................................. 310/11
[58] Field of Search .................................................. 310/11

[56] References Cited

U.S. PATENT DOCUMENTS

| | | | |
|---|---|---|---|
| 4,906,877 | 3/1990 | Ciaio | 310/11 |
| 5,298,818 | 3/1994 | Tada | 310/11 |

OTHER PUBLICATIONS

"An Outline of the R&D Project on Superconducting MHD Ship Propulsion in Japan", S. Motora et al., MHDS 91, pp. 53–68, Int. Symp. on Supercond. Magnetohydrodynamic Ship Propulson Paper No. 1-1, 1991 month unknown.

"Magnetohydrodynamic Sea Water Propulsion", M. Petrick et al., MHDS 91, Proc. MHDS 91, Int. Symp. on Superconducting Magnetohydrodynamic Ship Propulsion, Paper No. 5-2; date unknown.

"Experimental Studies of a Superconducting Electromagnetic Thruster for a Seawater Propulsion", J. Meng et al., Proc. MHDS91, Int. Symp. on Superconducting Magneto. Ship Propulsion, Paper No. 5-4 date unknown.

"Flow Characteristics Inside MHD Seawater Thruster", E. Doss, J. Propulsion & Power, vol. 7, No. 4, Jul.–Aug. 1991.

"Analyses of Magnetohydrodynamic Propulsion with Seawater for Underwater Vehicles", T. Lin et al., reprinted from Journal of Propulsion and Power, vol. 7, No. 6, Nov.–Dec. 1991, pp. 1081–1083.

"Considerations of Sea Water Conductivity Enhancement for Electromagnetic Thrusters", T. Lin, Proc. 25th Inter–Society Energy Conversion Engy. Conf. vol. 5, pp. 552–556. Date unknown.

"Study of the Influence of Electric and magnetic Fields on Seawater Magnetohydrodynamic Propulsion", T. Lin et al. Proc. of the 2nd (1992) In't. Offshore and Polar Engineering Conf. San Francisco, Jun. 1992.

"Analytical and Experimental Studies of the Helical Magnetohydrodynamic Thruster Design", J. Gilbert et al., Proc. of the 4th (1994) In't Offshore and Polar Engin. Conf. Osaka, Japan Apr. 10–15, 1994.

"Analytical and Experimental Studies of the Cyclic Magnetohydrodynamic Thruster Designs", D. Aumiller et al., Proc. 3rd Int. Offshore and Polar Energy Conf. vol. I, pp. 46–53. Date unknown.

"Seawater Conductivity Enhancement by Acid Seeding for Magnetohydrodynamic Propulsion", J. Gilbert et al. 27th Joint Propulsion Conf. Jun. 24–26, 1991/Sacramento, CA.

*Primary Examiner*—Steven L. Stephan
*Assistant Examiner*—Judson H. Jones
*Attorney, Agent, or Firm*—Thomas J. Monahan

[57] ABSTRACT

An MHD apparatus includes a solenoid coil that is symmetrically positioned about a central axis aperture. Upon energization, the coil produces an intense magnetic field along the central axis and within the aperture. A first cylinder having a first diameter is positioned in the aperture and a second cylinder which exhibits a second diameter that is less than the first diameter is positioned within the first cylinder. A helical web insulator is positioned between the first cylinder and the second cylinder and provides a helical fluid flow channel between first and second ends of the cylinders. A DC power supply is connected between the first and second cylinders, which produces a current flow that interacts with the magnetic field to exert an MHD propulsive force on seawater within the fluid flow channel. In this mode of operation, the apparatus pumps the saltwater or provides a thrust. When a flow of a conductive fluid is introduced through the helical channel, it enables an electric potential between the first cylinder and the second cylinder in the presence of the axial magnetic field. In this mode of operation, the apparatus delivers an output current when connected to a load. The MHD apparatus thus exhibits a relatively long path wherein the seawater interacts with both the radial electric field and the axial magnetic field.

7 Claims, 6 Drawing Sheets

MAGNETOHYDRODYNAMIC APPARATUS

GOVERNMENT SPONSORSHIP

This invention was made with Government support under Contract No. N00014-89-J-1693 awarded by the U.S. Department of the Navy. The Government has certain rights in the invention.

FIELD OF THE INVENTION

This invention relates to magnetohydrodynamic (MHD) devices and, more particularly, to a MHD thruster which exhibits high operational efficiencies.

BACKGROUND OF THE INVENTION

The presence of salts allows seawater to conduct electricity by electrolytic ion exchange. By passing an electric current through seawater in the presence of a magnetic field, a Lorentz (J×B) force will act to move the seawater in a direction normal to both the magnetic field and electric current directions. This is the basis for magnetohydrodynamic (MHD) propulsion. Few mechanical moving parts are required with MHD propulsion, and as a result, MHD propulsion can be very quiet. MHD technology became practical with the advent of multi-Tesla superconducting magnets. With superconducting magnets, the magnetic field can be increased while the magnet's weight and electrical consumption remain relatively low.

Recently there has been an increase of research and development activity in MHD propulsion. An experimental ship, YAMATO-1, utilizing MHD propulsion has recently been built and tested in Japan. Research in the United States includes thruster experiments at the Argonne National Laboratory (ANL), the Naval Undersea Warfare Center-Newport (NUWC-N) and the Applied Research Laboratory of Penn State University (ARL-Penn State). Analytical studies of seawater propulsion and seawater electrolysis, conductivity enhancements, and electrode studies have also been conducted. The experiments of ANL, NUWC-N, and ARL-Penn State use 6-, 3.2- and 8-Tesla (T) magnets, respectively. Among them, the magnets for ANL and NUWC are superconducting dipoles, while the one for ARL-Penn State is an electrosolenoid.

For descriptions of the aforesaid efforts, see: Motora, et al. (1991), "An Outline of the Superconducting MHD Ship Propulsion in Japan", Proc. MHDS91, Int. Symp. on Superconducting Magnetohydrodynamic Ship Propulsion, Paper No. 1-1; Petrick et al., (1991), "Magnetohydrodynamic Seawater Propulsion", Proc. MHDS91, Int. Symp. on Superconducting Magnetohydrodynamic Ship Propulsion, Paper No. 5-2; Meng et al., (1991), "Experimental Studies of Superconducting electromagnetic Thruster for Seawater Propulsion and Future Technology Challenges", Proc. MHDS91, Int. Symp. on Superconducting Magnetohydrodynamic Ship Propulsion, Paper No. 5-4; Lin et al., (1992), "Study of the Influence of Electric and Magnetic Fields on Seawater Magnetohydrodynamic Propulsion", Proc 2nd International Offshore and Polar Engg Conf., Vol. III pp. 8–13; Doss et al. (1991), "Flow Characteristics Inside MHD Seawater Thrusters", J. Propulsion and Power, Vol. 7, No. 4, pp. 635–641; Lin et al., (1991), "Analyses of Magneto-Hydrodynamic Propulsion with Seawater for Underwater Vehicles", J. Propulsion and Power, Vol. 7, No. 6, pp. 1081–1083; Lin (1990) "Consideration of Seawater Conductivity Enhancements for Electromagnetic Thrusters", Proc. 25th Inter-Society Energy Conversion Engr. Conf., Vol. 5, pp. 552–556; and Gilbert et al. (1991), "Seawater Conductivity Enhancement by Acid Seeding for Magnetohydrodynamic Propulsion", AIAA Paper No. AIAA-91-2499, 27th Joint Propulsion Conf., Sacramento, Calif., June 24–26.

The aforementioned studies have concentrated on straight duct MHD channels which use a long bore, and a low magnetic field dipole magnet ($\leq 6T$). Unfortunately, a dipole magnet requires extensive structural support which limits its attainable magnetic field. Much higher fields can be achieved with a large diameter bore solenoid magnet due to its axial-symmetric winding. However, straight MHD thrusters, when used in solenoid magnets, have limited thrust due to small aspect ratios.

Taking advantage of the high-field characteristics of the solenoid, single- and double-loop cyclotron systems were investigated (i.e. see: Aumiller et al. (1993), "Analytical and Experimental Studies of the Cyclic Magnetohydrodynamic Thruster Designs", Proc. 3rd International Offshore and Polar Engg. Conf. Vol. I, pp. 46–53). In the cyclotron design, the magnetic field and electric current are applied axially and radially, respectively. As a result, an MHD flow is induced in the azimuthal direction allowing increased active length and better utilization of the higher magnetic fields near the windings. Results from these studies were encouraging with the double-loop system exhibiting a higher efficiency than the single-loop.

There is a continuing need for quiet submarine propulsion units. Further, there is a need for quiet maneuvering jets for use in submarine devices. However, previous MHD propulsion units have not exhibited sufficient levels of efficiency to make them practical for such applications.

Accordingly, it is an object of this invention to provide an improved MHD propulsion unit which employs a solenoid coil structure.

It is another object of this invention to provide am improved MHD unit which can be used either for propulsion purposes or electrical generation purposes.

SUMMARY OF THE INVENTION

An MHD apparatus includes a solenoid coil that is symmetrically positioned about a central axis aperture. Upon energization, the coil produces an intense magnetic field along the central axis and within the aperture. A first cylinder having a first diameter is positioned in the aperture and a second cylinder which exhibits a second diameter that is less than the first diameter is positioned within the first cylinder. A helical web insulator is positioned between the first cylinder and the second cylinder and provides a helical fluid flow channel between first and second ends of the cylinders. A DC power supply is connected between the first and second cylinders, which produces a current flow that interacts with the magnetic field to exert an MHD propulsive force on seawater within the fluid flow channel. In this mode of operation, the apparatus pumps the saltwater or provides a thrust. When a flow of a conductive fluid is introduced through the helical channel, it enables an electric potential between the first cylinder and the second cylinder in the presence of the axial magnetic field. In this mode of operation, the apparatus delivers an output current when connected to a load. The MHD apparatus thus exhibits a relatively long path wherein the seawater interacts with both the radial electric field and the axial magnetic field.

DETAILED DESCRIPTION OF THE INVENTION

Figure 1:
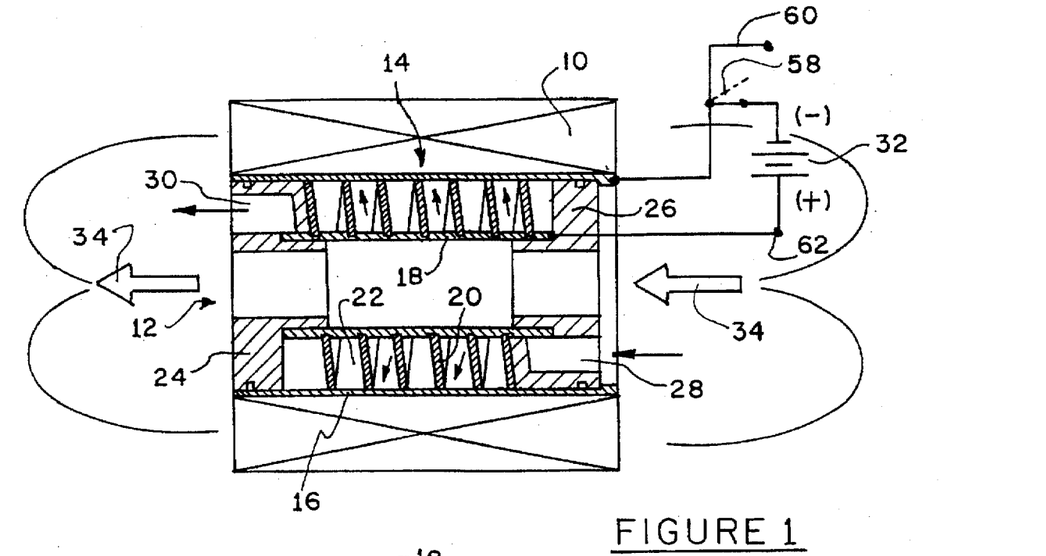
FIG. 1 is a schematic cross-sectional view of an MHD propulsion apparatus constructed in accordance with the invention.

Referring to FIG. 1, a superconducting solenoid coil 10 is shown in section and is shaped in the form of doughnut having a central aperture 12. An MHD propulsion unit 14 is positioned within aperture 12 and comprises an outer cylindrical cathode 16, an inner cylindrical anode 18, a helical web 20 which separates anode cylinder 18 from cathode cylinder 16 and provides a helical flow path 22 in an annulus therebetween; a pair of end caps 24 and 26 with end cap 26 having an inlet aperture 28 for seawater and an end cap 24 having an exit aperture 30 for seawater, both apertures communicating with helical flow path 22. A source of DC voltage 32 provides a DC potential difference between cathode cylinder 16 and anode cylinder 18. (It is to be understood that the illustrated polarity can be reversed and create an opposite direction current flow)

Arrows 34 represent the magnetic field passing through aperture 12 when solenoid coil 10 is energized by an appropriate source of power. Thus, coil 10, when an appropriate voltage is applied, carries high levels of current which result in magnetic field 34 exhibiting a strength in the range of 6–12 Tesla.

When a DC potential is applied between anode 18 and cathode 16, and seawater is introduced via inlet 28, it enters helical flow path 22 and is acted upon by MHD forces to flow to outlet 30. When the seawater flow is present in helical path 22, it creates a current flow path between cylindrical cathode 16 and cylindrical anode 18. The resulting electric current, when combined with the magnetic field 34, creates an MHD propulsive force on the seawater in helical flow path 22. Due to the fact that the effective length of helical flow path 22 is long, compared to the length of MHD apparatus 14, the effective forces exerted on the seawater are high and provide a substantial seawater outlet pressure at outlet 30. In addition, as will be shown from the data cited below, the structure of MHD apparatus 14, when combined with a solenoid coil 10 that generates a field strength on the order of 12 Tesla, enables a gross efficiency of operation to be obtained that is within the range of 14%–17%, which is substantially in excess of the efficiency of any known prior art of MHD thrusters.

Turning now to FIGS. 2–5, each of the major subcomponents MHD thruster 14 will be described.

Figure 2:
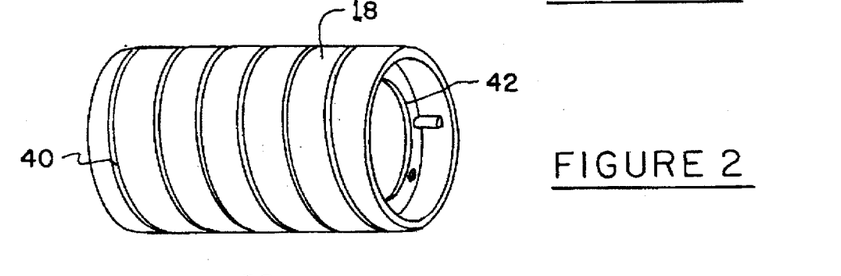
FIG. 2 is a perspective view of a second cylinder which forms the anode structure for the MHD propulsion apparatus of FIG. 1.

In FIG. 2, anode cylinder 18 is comprised of a titanium metal of cylindrical shape that is coated with a dimensionally stable anode material. A preferred such material is iridium oxide which is effective in preventing anodic dissolution of the underlying titanium metal. A spiral groove 40 is formed in the external surface of anode cylinder 18 and serves as a groove for positioning helical web 20. A pair of rings 42 are positioned within the interior of anode cylinder 18, a short distance from each end of the cylinder. Rings 42 serve to enable the mounting of end caps 24 and 26 thereto.

Figure 3:
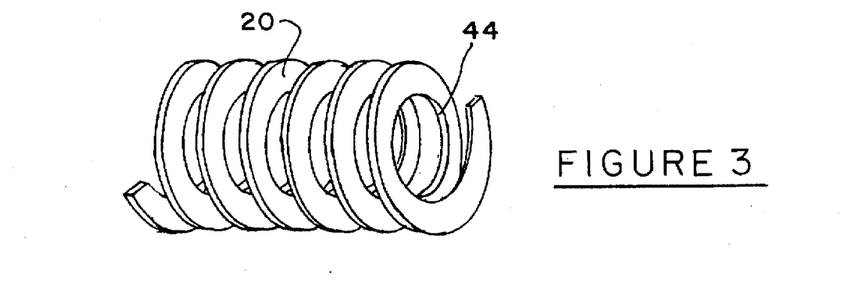
FIG. 3 is a perspective view of a helical web which provides an offset between the anode cylinder and a cathode cylinder.

In FIG. 3, a perspective view of helical web 20 is shown. Anode cylinder 18 fits within aperture 44 and, via an interaction between grooves 40 and the interior surface of helical web 20, serves to maintain helical web 20 in its spiral configuration. Helical web 20 is preferably comprised of a dimensionally stable, polymeric insulating material.

Figure 4:
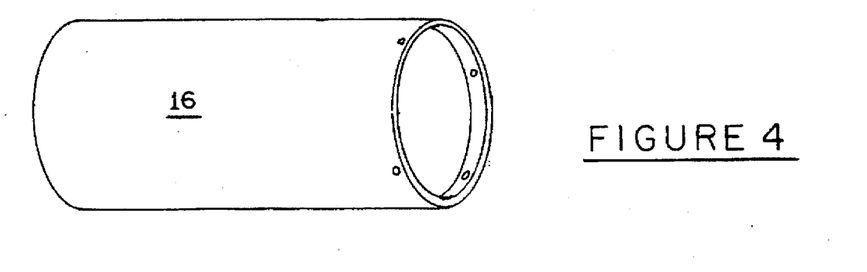
FIG. 4 is a perspective view of a first cylinder which forms the cathode of the MHD propulsion apparatus of FIG. 1.

FIG. 4 is a perspective view of cathode cylinder 16. Cylinder 16 is preferably comprised of Hastelloy-C 22 which is a nickel-based alloy containing chromium, molybdium, tungsten and iron. Hastelloy-C 22 resists seawater corrosion and cathode dissolution and further provides excellent electrical conductivity for current flow through anode cylinder 18.

Figure 5:
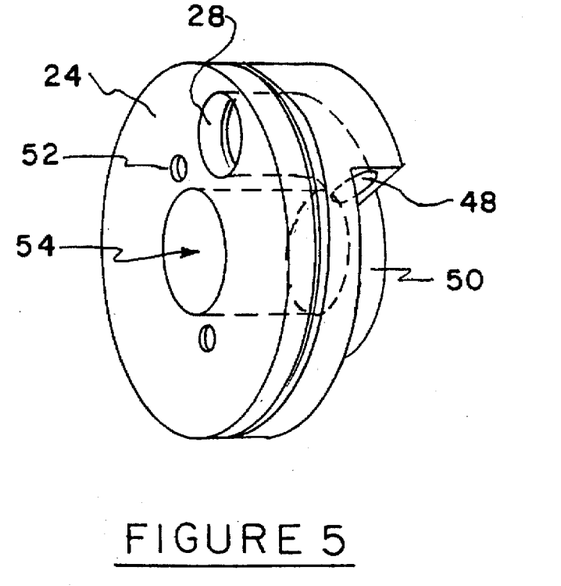
FIG. 5 is one of a pair of end caps which are positioned at either extremity of the anode/cathode cylinders and further provide entrance and exit pathways for saltwater.

FIG. 5 is a perspective view of one end cap 24. End cap 24 is made from an insulating material (e.g. an acrylic) and includes an inlet port 28 which communicates via an internally formed L-shaped pathway with an outlet 48. Outlet 48 is formed so as to direct seawater in a direction which is tangential to the outer surface of anode cylinder 18. In such manner, seawater is ejected into helical flow path 22. A mirror image of endcap 24 is positioned at the outlet end of MHD apparatus 14 and provides an outflow aperture for seawater which has been acted upon by the MHD forces.

A first cylindrical portion 50 of endcap 24 fits within the internal diameter of cylindrical anode 18 and is attached to ring 42 via bolts which extend therefrom and through bolt holes 52. The larger diameter portion of endcap 24 fits within the internal diameter of cathode cylinder 16 and provides an end seal for the annulus between the two cylinders (except for inlet 28). O-rings (not shown) serve to enable improved sealing between the two portions of end cap 24 and the respective anode and cathode cylinders. A central opening 54 enables access to the interior of anode cylinder 18 and allows passage of cabling for making of electrical connection to anode cylinder 18. No seawater passes through central aperture 54.

Figure 6:
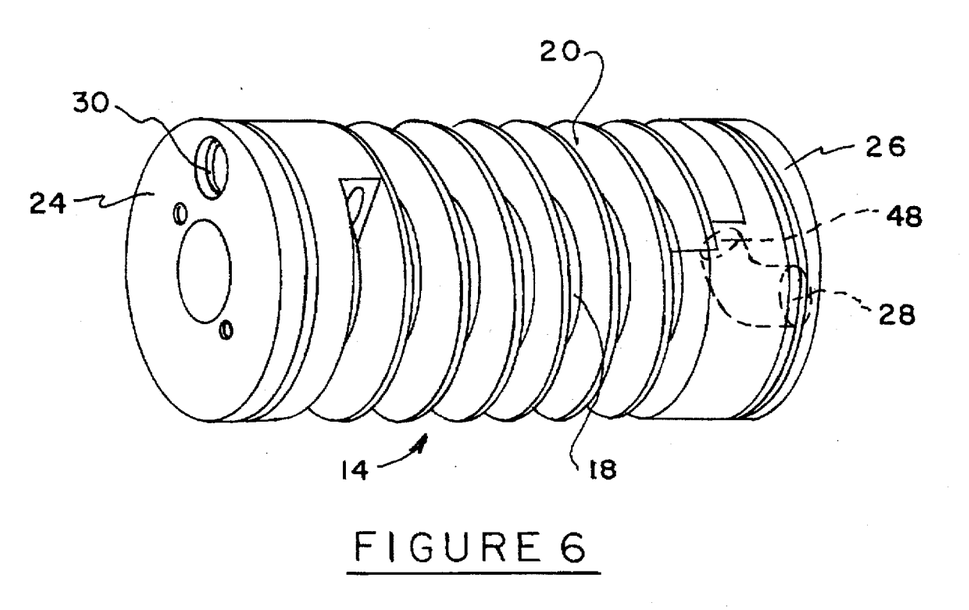
FIG. 6 is a perspective view of a partially assembled MHD propulsion apparatus, lacking the cathode cylinder.
Figure 7:
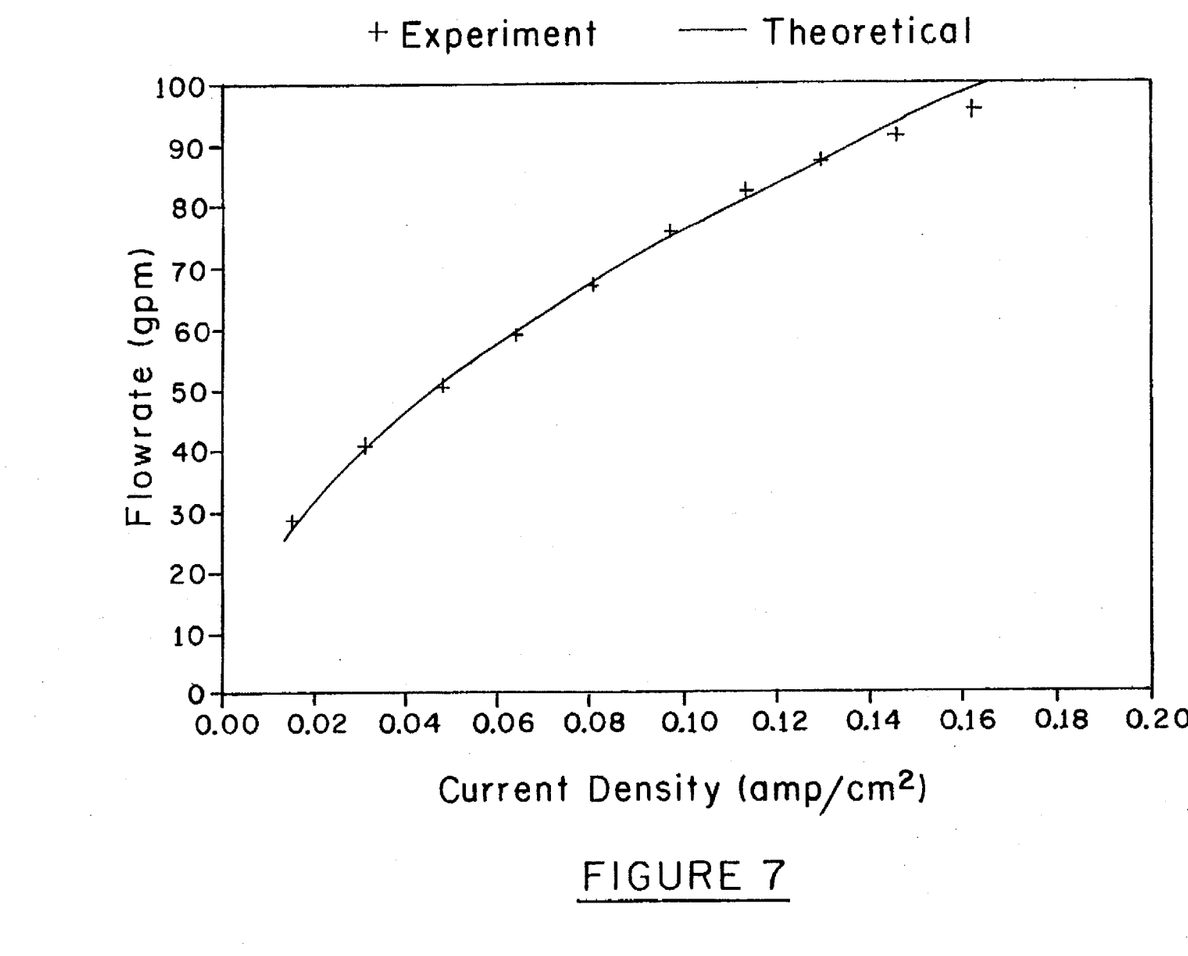
FIG. 7 is a plot of flow rate of synthetic seawater as a function of current density for a magnetic field of 12 Tesla.

FIG. 6 illustrates MHD apparatus 14 after it has been assembled, but before external cathode cylinder 16 has been put in place.

While MHD apparatus 14 has been described in the context of a thrust-producing device, it can also be employed to provide electrical power if a conductive fluid is pumped through helical channel 22. In such case, switch 58 is opened, power supply 32 is disconnected and output power is taken between terminals 60, 62.

Hereafter, mathematical models will be described that have been employed to analyze the operation of MHD apparatus 14 and to predict its performance. Experimental data will then be described which confirms the analytical data and indicates the improved efficiencies available from the invention.

ANALYTICAL MODELS

Nomenclature

| | |
|---|---|
| $A_{Flow}$ | cross-sectional area of MHD thruster (m²) |
| B | magnetic field strength (T) |
| D | distance between the electrodes (m) |
| $D_h$ | hydraulic diameter (m) |
| F | Lorentz force (N) |
| f | Darcy-Weisbach friction factor |
| $g_c$ | gravitational constant (m/s²) |
| I | current across the electrodes (A) |
| J | current density (A/m²) |
| K | form fact or for hydraulic losses |
| L | length of the MHD thruster (m) |
| $\dot{m}$ | mass flowrate (kg/s) |
| $\Delta P_{loop}$ | total loop pressure drop (Pa) |
| $\Delta P_{net}$ | net pressure rise across the test section (Pa) |
| $\Delta P_{MHD}$ | pressure rise due to MHD pumping (Pa) |
| R | electrical resistance (Ω) |
| r | radius of curvature |
| Re | Reynolds number |
| T | gross thrust (N) |
| $T_{net}$ | net thrust (N) |
| t | temperature |
| U | fluid velocity (m/s) |
| V | potential between electrodes (V) |
| $V_s$ | back electromotive force (V) |
| $V_o$ | overpotential (V) |
| $\chi$ | vertical distance from the centerplane of the magnet (in) |
| $\eta_m$ | gross mechanical efficiency (%) |
| $\eta_{m,net}$ | net mechanical efficiency (%) |
| $\rho$ | density of seawater (kg/m³) |
| $\theta$ | rise angle of the centerline of the helix flow passage (rad) |
| $\sigma$ | specific conductivity |

To optimize the geometry and to predict the performance of the thruster in a closed loop, analytical models were developed and coded. This code calculates the MHD-induced flowrate by equating the pressure rise in the thruster to the sum of all the hydraulic losses around the loop. In order to simplify the calculations and more accurately model the system, the MHD pumping region is divided into a variable number of segments where certain parameters vary as a function of location.

PRESSURE RISE IN THE MHD PUMPING REGION

According to the Lorentz Law, the force created by the thruster is, $$\vec{F} = \vec{J} \times \vec{B} \tag{1}$$

where $\vec{F}$=the resultant Lorentz Force vector per unit volume $\vec{J}$=the electric current density vector and $\vec{B}$=the magnetic field vector Due to the fact that the magnetic field strength and electric current are functions of position in the magnet, the pressure rise is calculated for each segment in the MHD pumping region. Therefore, the total pressure rise due to the MHD effect in the direction of flow is given by, $$\Delta P_{MHD} = \frac{\cos\theta}{A_{flow}} \sum_{j=1}^{N} I_j B_j D \tag{2}$$

where j=the segment index
N=the total number of segments
$I_j$=electric current in segment j
$B_j$=magnetic field in segment j
D=gap distance between electrodes
$A_{flow}$=the thruster's flow area, and
$\theta$=rise angle of the centerline of the flow passage For the 12T superconducting magnet used in the experiments, the vertical magnetic strength profile at the centerline of the flow channel is given by $$B(\chi) = B_0(1.0175 + 0.00047\chi - 0.00234\chi^2 - 0.00002\chi^3) \tag{3}$$

where $\chi$=the vertical distance from the midplane of the magnet bore (in); and $B_0$=the magnetic field strength at the center of the bore.

RELATIONSHIP BETWEEN VOLTAGE AND CURRENT

In order to use Eq. (2), the relationship between the current, magnetic field, two-phase fluid velocity in the test section (U) and overpotential ($V_o$), the minimum voltage required for electrolysis must be ascertained for each segment. There are two phenomena which diminish the electric potential: the back electromotive force (EMF) and the overpotential. The magnitude of the back EMF is given by, $$V_s = B\ U\ D \tag{4}$$

The polarities of the electrodes in the experiments described herein are shown in FIG. 1. The overpotential for this electrode arrangement was experimentally determined to be approximately 2.41 V. Therefore the current can be calculated from, $$I_j = \frac{V - V_o - B_j U_j D}{R_j} \tag{5}$$

where $R_j$=the electrical resistance of the segment; and $U_j$=the two-phase fluid velocity in the segment.

To calculate the resistance of each segment in the test section the following equation is employed, $$R_j = \frac{\ln\left(\frac{R_{outer}}{R_{inner}}\right)}{\phi w \sigma_{effective}} \cos\theta \tag{6}$$

where $r_{outer}$=the radius of the outer electrode;

$r_{inner}$=the radius of the inner electrode;

$\phi$=the angle subtended by the segment j;

w=the height of the flow passage;

$\sigma_{effective}$=effective specific conductivity of the seawater; and $\theta$=the climb angle of the centerline of the flow passage.

The specific conductance of seawater at room temperature is between 4–5 Ω/m. However, as the experiments progress the temperature and chemical composition of the water change. Both of these effects will have a significant impact on the conductivity of the seawater. Therefore, the effective conductivity is experimentally determined for each set of experiments from the voltage-current relationship.

CALCULATION OF PRESSURE DROP

The above equations can be used to calculate the MHD induced gross pressure rise in the thruster, which in steady state operation is equal to the frictional and form pressure losses around the test loop. To ease the calculation of the pressure drops, the loop is divided into two parts, a single-phase region and a two-phase region. The single-phase region extends from the outlet of a holding tank to the entrance of the thruster. The two-phase region is created by gaseous electrolysis products at the electrodes and extends from the entrance of the thruster to the inlet of the tank. Also, since the loop is modeled as a closed system, all gravitational terms are omitted.

Assuming that two-phase density changes are negligible, the elevation head lost in one part of the loop is gained in another. This is particularly true when the void fraction of the loop is small.

In each region, there are both frictional losses and form losses. In order to model the form losses, an equivalent number of nominal pipe diameters was determined for the 90° elbows, tee's and ball valves.

The expansion and contraction losses were handled using a form factor technique $$\Delta p = K \rho \frac{U'^2}{2} \tag{7}$$

where
K=a form factor
ρ=fluid density
and U'=the fluid velocity in the smaller area.

The form factors are different for expansion and contraction, and are given by, $$K_{exp} = (1-\beta)^2 \tag{8}$$

and $$K_{con} = \frac{1}{2}(1-\beta) \tag{9}$$

where

β=the ratio of the smaller area to the larger one, respectively. The tank was modeled as an infinite reservoir. Therefore, the above equations were used with β equal to zero. The pressure drop associated with the azimuthal turning fluid in the test section is also handled with a form factor.

$$K_b = (n-1)\left(\frac{\pi}{4} f \frac{r}{D_h} + \frac{1}{2}K\right) + K \tag{10}$$

where
n=number of 90° turns;
$D_h$=hydraulic diameter of the pipe;
r=radius of curvature;
f=friction factor; and
K=the form factor for a single 90° turn.

The K in the above equation is given as a multiple of f and varies as a function of $r/d_h$. Therefore, this turning form factor can be expressed as an equivalent length L. This allows two-phase effects to be considered. However, due to the unconventional helical flow passage, the value of K was parametrically varied to best match the experimentally calibrated pressure drop data of the test section. A K value of approximately 8 is currently used. Since the path traversed by the fluid is helical, the effective length of the passage will be given by L/cosθ.

The frictional losses were handled using the standard method of calculating a friction factor, f, for a straight pipe flow, $$\Delta p_{friction} = f \frac{L}{D_h} \rho \frac{U^2}{2} \tag{11}$$

One of the following three correlations was used to calculate the Darcy-Weisbach friction factor, f. These correlations for laminar, transition, and turbulent regimes are:

$$f = \frac{64}{Re} \quad Re \leq 2300 \tag{12}$$

$$f = 3.16 \, Re^{-.25} \quad 2300 < Re \leq 2 \times 10^4$$

$$f = .184 \, Re^{-.2} \quad Re > 2 \times 10^4$$

where
Re=Reynolds number.

Since viscosity affects the Reynolds number, changes in viscosity due to temperature must be considered. To account for this, a correlation was developed for viscosity as a function of temperature based on known values for seawater at 35% salinity.

$$v = \left(-0.125 + \frac{95.471}{t} - \frac{1078}{t^2}\right)\left(\frac{10^{-6} m^2}{s}\right) \tag{13}$$

where
t=temperature in °F.

DETERMINATION OF THRUST AND EFFICIENCY

Once the MHD pressure rise is known, the gross thrust efficiency can be calculated. From Eq. (2), the gross thrust produced by the thruster is given by, $$T = \Delta P_{MHD} A_{flow} \tag{14}$$

The thrust includes the pressure losses within the thruster. Therefore, a more useful thrust, net thrust, should be defined as the thrust due to the pressure rise of the MHD thruster. The pressure rise across the thruster, $\Gamma P_{net}$, can be experimentally measured and is the net result of the MHD pressure rise minus the internal losses of the thruster. The net thrust is, $$T_{net} = \Delta P_{net} A_{flow} \tag{15}$$

The gross mechanical efficiency is a measure of how well the thruster can convert electrical power into mechanical power and is defined as, $$\eta_m = \frac{\text{Power produced}}{\text{Power consumed}} = \frac{TU}{VI} \tag{16}$$

The velocity in the above equation is the fluid velocity in the thruster, which is dependent on the void fraction. For the same reason as given for Eqs. (14) and (15), there should be a gross mechanical efficiency $\eta_m$ based on T and a net mechanical efficiency $\eta_{m,net}$ based on $T_{net}$.

In the development of the computer code, Eq. (16) was used to determined the mechanical efficiency of the MHD thruster. For these calculations a conservative assumption of a single phase velocity was used.

SOLUTION TECHNIQUE

The above equations were incorporated into a computer code which predicts the performance characteristics of a specified MHD thruster and test loop. An iterative process is used to calculate the correct mass flow rate, for a given voltage. The code uses the magnetic field strength at the center of the bore and the voltage across the test section as inputs. First, a reasonable estimation of the fluid velocity in the thruster is made. From the current, the pressure rise and segment pressure drop are determined. The pressure drop terms are added to the pressure drop in the remainder of the loop. If the pressure drop around the loop is smaller than the pressure rise in the thruster, a larger mass flowrate is used in the next iteration. If the thruster pressure rise is smaller in magnitude, a lower mass flowrate is used as the next guess. This process continues until the following criterion is met:

$$\frac{|\Delta P_{MHD} - \Delta P_{Loop}|}{\Delta P_{MHD}} \leq 1 \times 10^{-6} \quad (17)$$

The code described above can be used with different magnetic field strengths and electric potentials as input. These different conditions allow the theoretical effects of the two parameters to be examined. Since the anode makes at least partial contact with the fluid for all seven revolutions, the computer code simulates the test section as if the conducting region is precisely 7 loops in length.

EXPERIMENTAL APPARATUS

THE Seawater LOOP

A closed seawater loop was installed in and around the magnet. The loop had a 115-gallon tank which contained the premixed sea salt solution. The solution used was a commercially available substitute for seawater that meets ASTM standard D1141-52. For simplicity, the sea salt solution will be referred to as seawater.

Once the MHD pumping commences, seawater is drawn from the bottom of the tank where a portion is diverted through a conductivity probe. The entire flow then passes through a turbine flowmeter and enters the thruster inside the magnet. The flow inside and beyond the thruster becomes two-phase as a result of electrolysis. Because the bubbles tend to float up due to the buoyancy effect, the plumbing downstream of the test section is designed to run vertically upward to insure removal of gaseous products. Finally the flow returns to the tank and completes the loop. Any residual gases discharged to the tank escape the system through the ventilation system at the top of the tank.

THRUSTER

The helical thruster utilized a cylindrical geometry with a solenoid magnet. In this design, a radial electric current combined with an axial magnetic field creates an azimuthal Lorentz force and subsequent flow. The flow enters and exits the caps of the test section through 1.75-in inner diameter, clear acrylic pipes. The flow passage within each cap consists of a 90° elbow and a diffusion nozzle, which was specially machined to provide a smooth transition between the circular flow area of the loop and the rectangular flow area of the MHD pumping region. The dimensions of the MHD pumping region are as follows: inner radius, 2.773 in; outer radius, 4.563 in; electrode gap distance, 1.79 in; electrode width 1.413 in, and pitch, 1.6 in, which corresponds to a rise angle of 3.97° at the centerline of the flow passage. Since the flow makes seven revolutions through the thruster, the effective length of the thruster as defined by the arc length of the midline of the flow passage is equal to 161.7 in, assuming seven conducting loops. The hydraulic diameter is 1.579 in. Therefore, the aspect ration ($L/D_h$) is 102.4.

The electrodes are insulated by PVC fins above and below the flow passage, allowing only the seawater solution to conduct electricity in the MHD pumping region. The cathode material is Hastelloy C-22 and the is dimensional stable anode (DSA). DSA is a trade name for corrosion resistant anodes consisting of a titanium substrate coated with a rare-earth (Ru or IR) oxide. The DSA coating for these experiments is iridium oxide.

THE MAGNET

The magnet used in the experiments is a 12-T superconducting solenoid magnet, 58 in height with a 14-in diameter bore. The superconducting wires used are $Nb_3Sn$ for the inner coils and NbTi for the outer pancake. They are all submerged in liquid helium under a subatmospheric pressure. It is important to point out that the subatmospheric pressure is needed to maintain liquid helium at 1.8° K. (not 4.2° K.) for the maximum attainable current. Therefore, a large helium pump is required. The current required at 12 T is 2069 amp.

INSTRUMENTATION AND DATA ACQUISITION

The nature of the experiments is such that several physical parameters need to be monitored simultaneously (i.e. flowrate, electrode current and voltage, etc.) To accomplish this a computer aided data acquisition system was employed. All of the signals are conditioned such that 0–10 V analog signals are available to be used as inputs to a computer system.

An EG&G Flow Technology model FT-32 turbine flowmeter with a model CAO-3 RF pickoff was used for these experiments. The RF pickoff operates by sensing a change in inductance due to the movement of a small magnet slug implanted in each blade of turbine. This operation is very sensitive to an external magnetic field therefore a magnetic shield was employed. A weight calibration of the flowmeter was done prior to all experiments.

The current to the electrodes is supplied by a Sorensen, model DCR16-625T, SCR regulated d.c. power supply. The supply is capable of providing 625 amp at 16 V. The current output is remotely controlled by the data acquisition system. A 300 amp shunt resistor is used to measure the total current through the thruster. The potential drop across the electrodes is measured at the thruster. The temperature of the solution is monitored using a resistance temperature detector (RTD) calibrated for the appropriate temperature range. As a backup, a J-type thermocouple is also employed. To measure the net pressure rise across the thruster, a Validyne model DP-15 differential pressure transducer is operated in conjunction with a Validyne model CD-23 digital transducer indicator. The conductivity of seawater is determined by the measured voltage-current relationship and the resistance formulations shown in Eqs. (5–6).

The data is collected using a Metrabyte model DAS-16F, high speed analog-to-digital card with customized software. For a given B-field, the program sets the desired current and, after allowing the flow to stabilize, collects 1050 points of data per channel in approximately 30 seconds. At the end of the data collection, the mean and standard deviation of each parameter are calculated. Three data sets are collected at each current. Once the data has been obtained for a given B-field, the magnetic field is changed and the process is repeated.

EXPERIMENTS PERFORMED

Two different studies were performed to evaluate the performance of the MHD thruster: determination of hydraulic resistance of the loop; and determination of the MHD-induced flow characteristics. The first experiments, hence referred to as calibration experiments, to be performed included measuring the hydraulic resistance of the test loop as a function of flowrate and electric current. This is done by placing a centrifugal pump in the test loop and measuring the pressure required to achieve a given flowrate at given current and temperature. This data is placed in a data file. The gross pressure rise in the thruster can then be determined by interpolation within this file.

To determine steady-state performance characteristics, a magnetic field strength is first established. A given electric current is then applied to the electrodes which causes an MHD-induced flow. The flow is allowed to stabilize. Once the flow has stabilized three data sets are taken. The data acquisition software calculated the gross thrust, net thrust, and the corresponding efficiencies for each data set. In an actual MHD experiment, the net pressure rise across the thruster is measured. Therefore, the net thrust is easily determined. However, the gross thrust requires the information of the measured thruster pressure rise as well as the pressure loss for the thruster. This thruster loss is determined by the first calibration experiments mentioned above. The sequence is then repeated for each value of electric current at this magnetic field strength. Once this has been completed, a new magnetic field is chosen and the procedure is repeated.

For these experiments it was assumed that no gas is produced in the test section since few bubbles were observed at the test section exit. As mentioned above, only the 7-conducting-loop configuration is modeled. In order to plot versus current density, current density has been defined as the current divided by the averaged electrode areas (1260 $cm^2$). Since this value is a constant, a given current will infer the same current density regardless of the loop configuration.

FIGS. 7–10 show both the theoretical and experimental flowrates, voltages, thrusts, and mechanical efficiencies at different current densities for the seven-conducting loop system operating at 12 T. Good agreement between theoretical and experimental results is achieved, especially with flowrate and voltage. As can be seen from FIG. 7, the flowrate varies with the current to a power of approximately ½. This is expected because the MHD pressure rise varies linearly with the applied current (Eq. (2)). From Eqs. (7–11) it can be seen that the hydraulic pressure should vary as the flowrate, raised to a power slightly less than 2. Therefore, the flowrate should vary as the current (density) raised to the reciprocal of this power.

Figure 8:
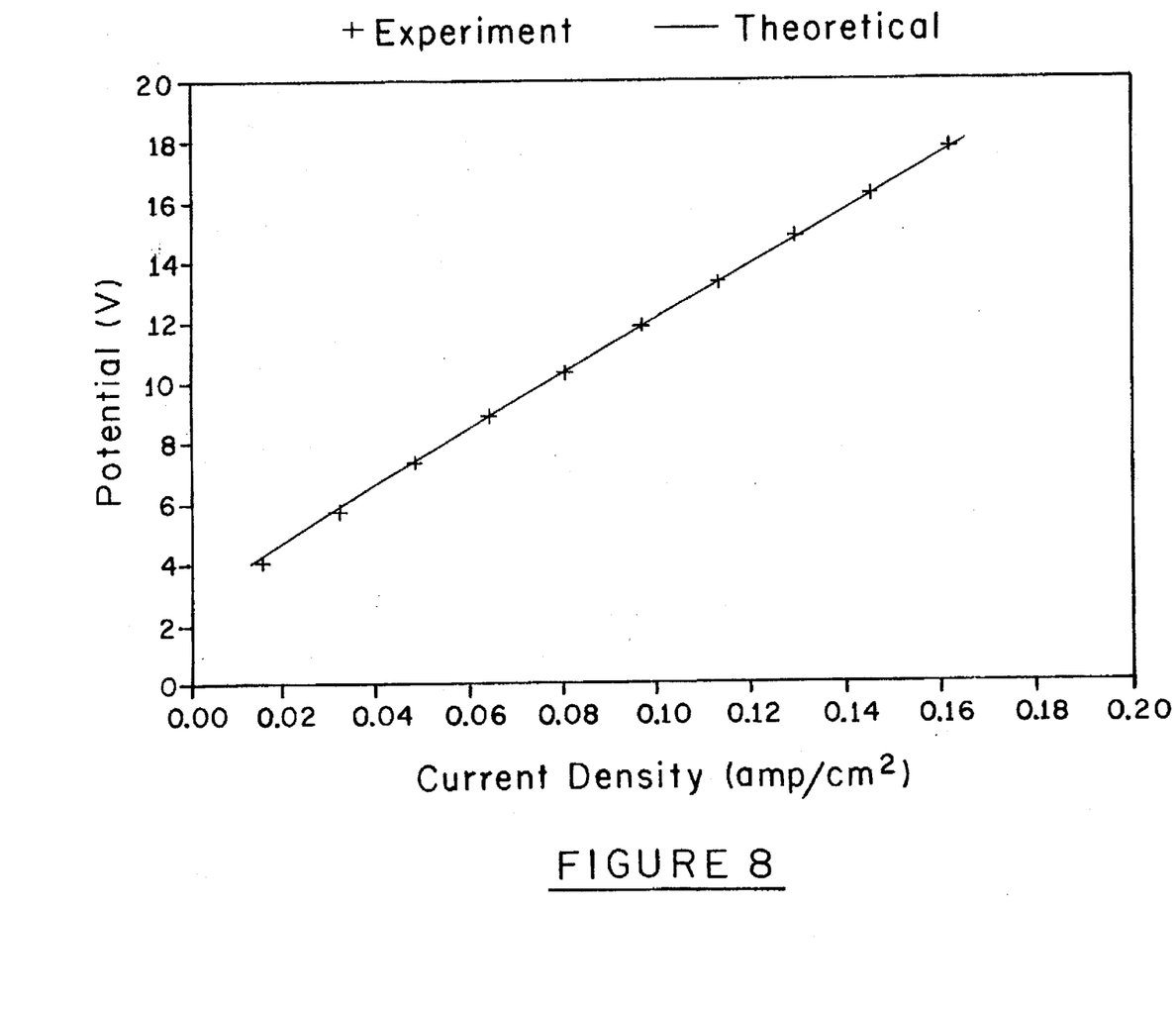
FIG. 8 is a plot of voltage as a function of current density for an applied magnetic field of 12 Tesla.

The voltage-current relationship is shown in FIG. 8. As predicted by Ohms law, this is a linear relationship. The extension of the experimental points near zero current density reveals that the electrolytic overpotential is about 2.41 V. The slope of the best-fit theoretical line suggests that, from Eq. (6), the seawater conductivity is about 4.84 $\Omega$m. This information is then used by the theoretical model to calculate thrusts and efficiencies.

Figure 9:
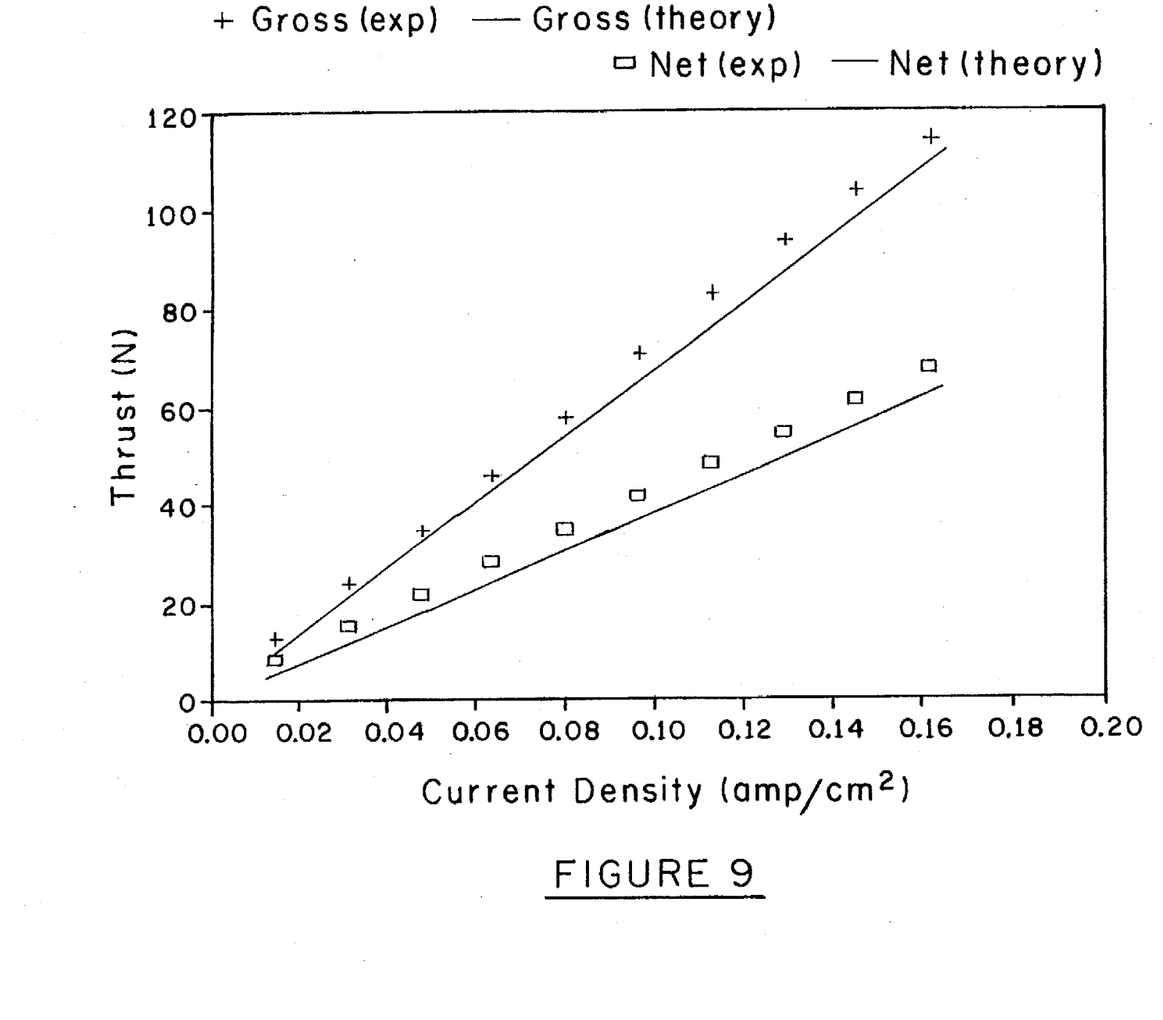
FIG. 9 is a plot of thrust as a function of current density for an applied magnetic field of 12 Tesla.

FIG. 9 shows the gross and net thrusts for both the experimental values and the theoretical prediction. The theoretical thrusts portray the same linear behavior but consistently underpredict the experimental values. As mentioned above, the thrust should vary linearly with the electric current. The difference in magnitude between theory and experiment can be attributed to temperature and conductivity drifts during each experiment: The theoretical model used the experimentally determined average conductivity and temperature for each run. The discrepancy can also be attributed to the drift of the pressure transducer and flowmeter calibrations before and during the MHD thruster experiments. It is noted that the net thrust is approximately ⅔ of the gross thrust.

Figure 10:
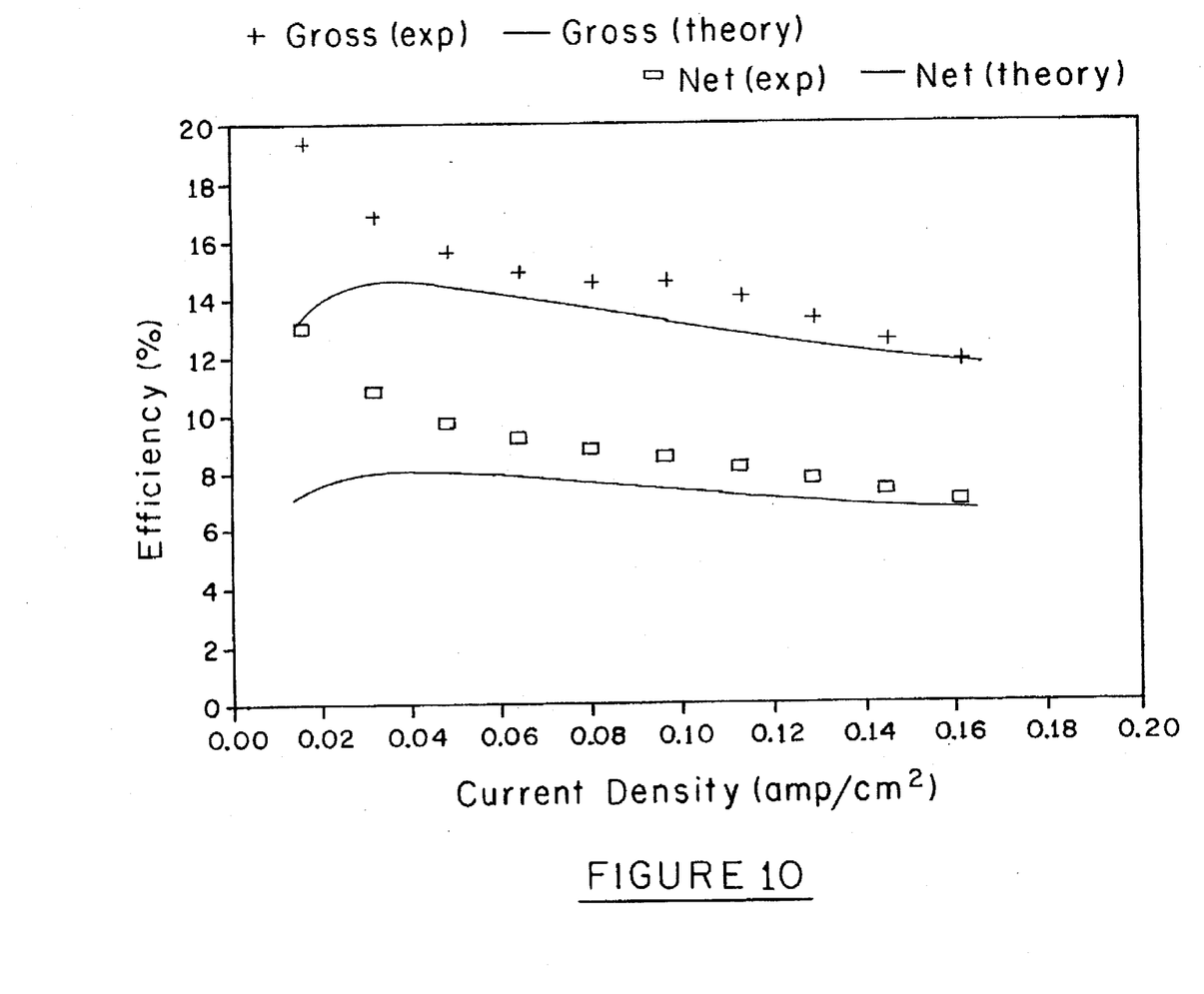
FIG. 10 is a plot of efficient as a function of current density for an applied magnetic field of 12 Tesla.

The plot of the gross and net mechanical efficiencies, FIG. 10, shows that the theoretical model does a fair job of predicting the behavior of the thruster. The efficiency varies as the current raised to a power $\approx -\frac{1}{2}$. This effect can be seen from Eq. (16). Using the above arguments from the flowrate discussion, the numerator will vary as $I^{1.5}$ whereas, if the applied voltage is large compared to the overpotential, the denominator will vary as $I^2$. At small currents, where the applied voltage is comparable to overpotential, the efficiency is not a strong function of current. To attain a current density of 0.01 amp/$cm^2$, 3.8 V are required. Since the overvoltage for the system is 2.41 V, only 1.4 V of the voltage applied at this condition is used to generate current. This causes a decrease in efficiency at lower voltages. As the current is increased, the overpotential effect is diminished and the efficiency begins to increase. This effect when combined with the trend of decreasing efficiency with increased current causes a peak efficiency to occur at approximately 0.03 amp/$cm^2$.

The efficiency peaking is reflected by the theoretical curves, but not by the experimental data. The underpredictions of the theory are for the same reasons discussed earlier for thrust (FIG. 9). Thrust is unpredicted for the entire range, therefore, efficiency is also. The more dramatic underprediction at low current densities is primarily attributed to a propagation of experimental/theoretical errors. As can be seen from Eq. (16), the denominator becomes very small as both current and voltage decrease simultaneously, thus allowing small differences between theoretical and experimental potential, thrust and velocity to be amplified in the calculation of efficiencies (FIG. 10).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A magnetohydrodynamic (MHD) apparatus comprising:

coil means symmetrically positioned about a central axis and having an aperture aligned with said central axis;

means for causing said coil means to produce an intense magnetic field along said central axis and within said aperture;

first cylinder means having a first diameter, aligned with said central axis and positioned in said aperture;

second cylinder means having a second diameter that is less than said first diameter, aligned with said central axis and positioned within said first cylinder means;

helical channel means positioned between said first cylinder means and second cylinder means and including a helical insulating web which extends between said first cylinder means and said second cylinder means so as to provide a helical fluid flow channel between first and second ends of said first cylinder means and second cylinder means;

power supply means for applying a DC voltage between first said cylinder means and said second cylinder means; and means for introducing a flow of salt water through said helical channel means, said salt water providing a conduction path between said first cylinder means and said second cylinder means, a current flow within said conduction path interacting with said intense magnetic field to exert an MHD force on said salt water.

2. The MHD apparatus as recited in claim 1 wherein said helical channel means further comprises a pair of insulating end caps, each end cap having a fluid pathway which communicates with said helical channel means in a direction substantially tangential to an external surface of said second cylinder means.

3. The MHD apparatus as recited in claim 1 wherein said first cylinder means is comprised of a nickel-based alloy.

4. The MHD apparatus as recited in claim 3 wherein said second cylinder means comprises a titanium metal cylinder coated with a layer of iridium oxide.

5. A magnetohydrodynamic (MHD) apparatus comprising:

coil means symmetrically positioned about a central axis and having an aperture aligned with said central axis;

means for causing said coil means to produce an intense magnetic field along said central axis within said aperture;

first cylinder means having a first diameter, aligned with said central axis and positioned in said aperture;

second cylinder means having a second diameter that is less than said first diameter, aligned with said central axis and positioned within said first cylinder means;

helical channel means positioned between said first cylinder means and second cylinder means and including a helical insulating web which extends between said first cylinder means and said second cylinder means so as to provide a helical fluid flow channel between first and second ends of said first cylinder means and second cylinder means;

conductor means connected to said first cylinder means and said second cylinder means; and means for introducing a flow of a conducting fluid through said helical channel means, said conducting fluid providing a conduction path for a current flow between said first cylinder means and said second cylinder means, said current flow available as an output via said conductor means.

6. The MHD apparatus as recited in claim 5 wherein said helical channel means further comprises a pair of insulating end caps, each end cap having a fluid pathway which communicates with said helical channel means in a direction substantially tangential to an external surface of said second cylinder means.

7. The MHD apparatus as recited in claim 5 wherein said first cylinder means and second cylinder means are comprised of corrosion-resistant materials.

* * * * *